US006085409A

United States Patent [19]
Wanha

[11] Patent Number: 6,085,409

[45] Date of Patent: Jul. 11, 2000

[54] UNIVERSAL CONTACT INSERTION TOOLING

[75] Inventor: Christopher Donald Wanha, Costa Mesa, Calif.

[73] Assignee: ITT Manufacturing Enterprises, Inc., Wilmington, Del.

[21] Appl. No.: 08/918,281

[22] Filed: Aug. 25, 1997

[51] Int. Cl.[7] ...................................................... B23P 19/00

[52] U.S. Cl. ................................ 29/747; 29/758; 29/760; 29/876

[58] Field of Search ............................. 29/747, 758, 760, 29/876

[56] References Cited

U.S. PATENT DOCUMENTS

| | | | |
|---|---|---|---|
| 3,664,016 | 5/1972 | Sevc et al. | 29/407 |
| 4,196,509 | 4/1980 | Del Rico | 29/747 |
| 4,356,626 | 11/1982 | Waghorn | 29/747 |
| 5,380,226 | 1/1995 | Anderson | 439/724 |
| 5,738,549 | 4/1998 | Larquerbe | 439/724 |

*Primary Examiner*—Lee Young
*Assistant Examiner*—Kevin G. Vereene
*Attorney, Agent, or Firm*—Thomas L. Peterson

[57] ABSTRACT

Tooling is provided for inserting electrical contacts into holes (20) of a connector insulator (90), which enables easy setup for different connectors. The tooling includes a lower tool (12) for supporting a connector housing (14) and an upper tool (16) which is vertically slidable toward the lower one and which carriers insertion pins (30, 32) for pushing contacts into the insulator. The upper tool includes a block (22) having three long rows of pin passages (24) and a backup device (50) which lies over insertion pins lying in the passages to push them down. Insertion pins of a desired type (for inserting pin or socket contacts) can be inserted into selected passages corresponding to the particular connector into which contacts are to be inserted.

13 Claims, 6 Drawing Sheets

FIG. 9
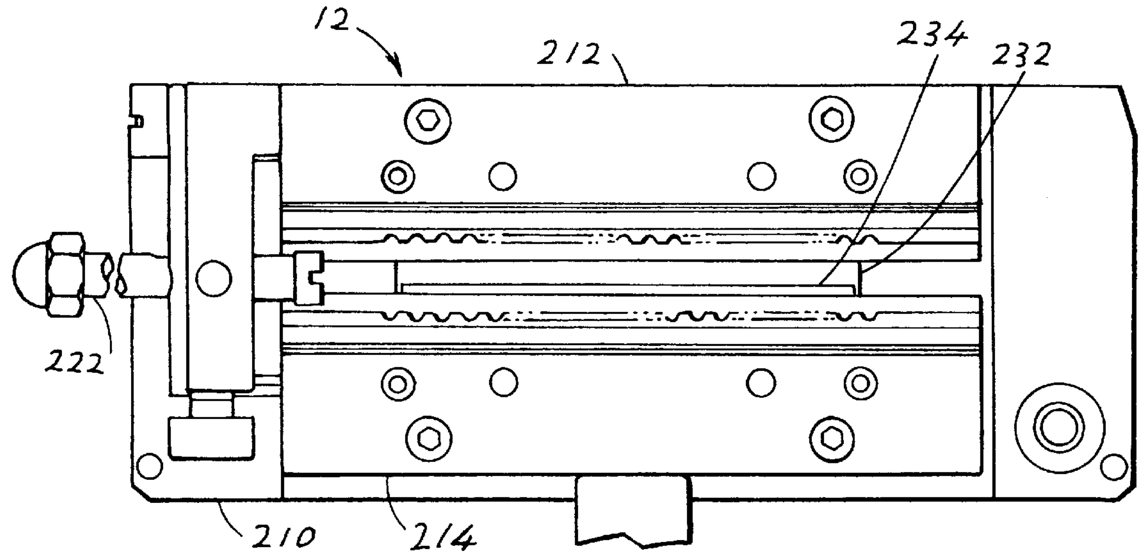
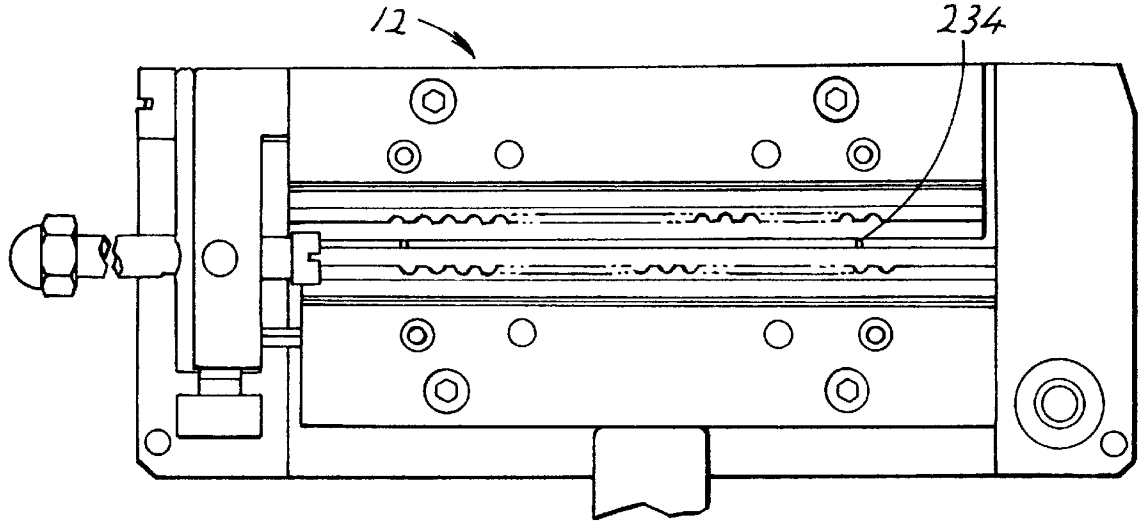
FIG. 10

UNIVERSAL CONTACT INSERTION TOOLING

BACKGROUND OF THE INVENTION

Machined electrical contacts are commonly installed in holes of a connector insulator by forcefully pressing the contacts into the holes, with an interference fit of barbs retaining the contacts. Two basic approaches are used to insert and seat the contacts, one being single contact insertion, or stitching, and the other being multiple contact insertion, or gang loading. In machine stitching, one contact at a time is inserted, which requires either an expensive machine setup or time consuming hand insertion of one contact at a time. In gang loading, many or all contacts are inserted at one time. Gang loading has required tooling with one or more rows of accurately positioned projections. Most connectors have two or three rows of contacts, but the number and positions of the contacts varies. It is costly to manufacture tooling for each of the numerous connectors, and inconvenient to store all of the tooling. Tooling that enabled the insertion of contacts in a variety of connectors, would be of value.

SUMMARY OF THE INVENTION

In accordance with one embodiment of the present invention, contact insertion tooling is provided, which enables rapid changeover to insert contacts in a variety of connectors. The tooling includes a lower tool for supporting a connector housing that includes an insulator with holes, and an upper tool which is vertically slidable toward the lower one. The upper tool includes a block having horizontal rows of vertical passages, insertion pins that can be installed in selected passages, and a backup device which lies over the insertion pins and which can push them down when the upper tool is pushed down in a press.

Each of the insertion pins lies loosely in a corresponding passage and the passages are tall enough, that each insertion pin lies within a few degrees of the vertical but can shift horizontally to accommodate tolerances in the spacing between connector holes.

The backup device which lies over the upper ends of the insertion pins to depress them, includes a top cover that is fixed to projections that project from opposite ends of the block, to leave a space between them, and a backup plate that lies in the space. The backup plate can be shifted from a first position wherein it depresses only some of the pins, and a second position wherein it depresses the other pins. The backup plate is provided with inclined grooves so that in the first position every other pin along a row is pressed down, while in the second position all pins are pressed down.

The lower tooling includes fixed and adjustable support parts that each supports one side of the connector housing. The adjustable part can be moved toward and away from the fixed part to support wider or narrower connectors. A spacer lies between the support parts to fix their spacing, and a screw extends between the support parts to clamp the spacer between them. The upper tooling is vertically slidable with respect to the fixed support part, to accurately position the insertion pins with respect to the connector.

The novel features of the invention are set forth with particularity in the appended claims. The invention will be best understood from the following description when read in conjunction with the accompanying drawings.

BRIEF DESCRIPTION OF THE DRAWINGS

FIG. 9 is a plan view of the lower insertion tool, set up for a connector with three rows of contact-receiving holes.

FIG. 10 is a plan view similar to that of FIG. 9, but set up to receive a connector with two rows of contact-receiving holes.

DESCRIPTION OF THE PREFERRED EMBODIMENT

Figure 1:
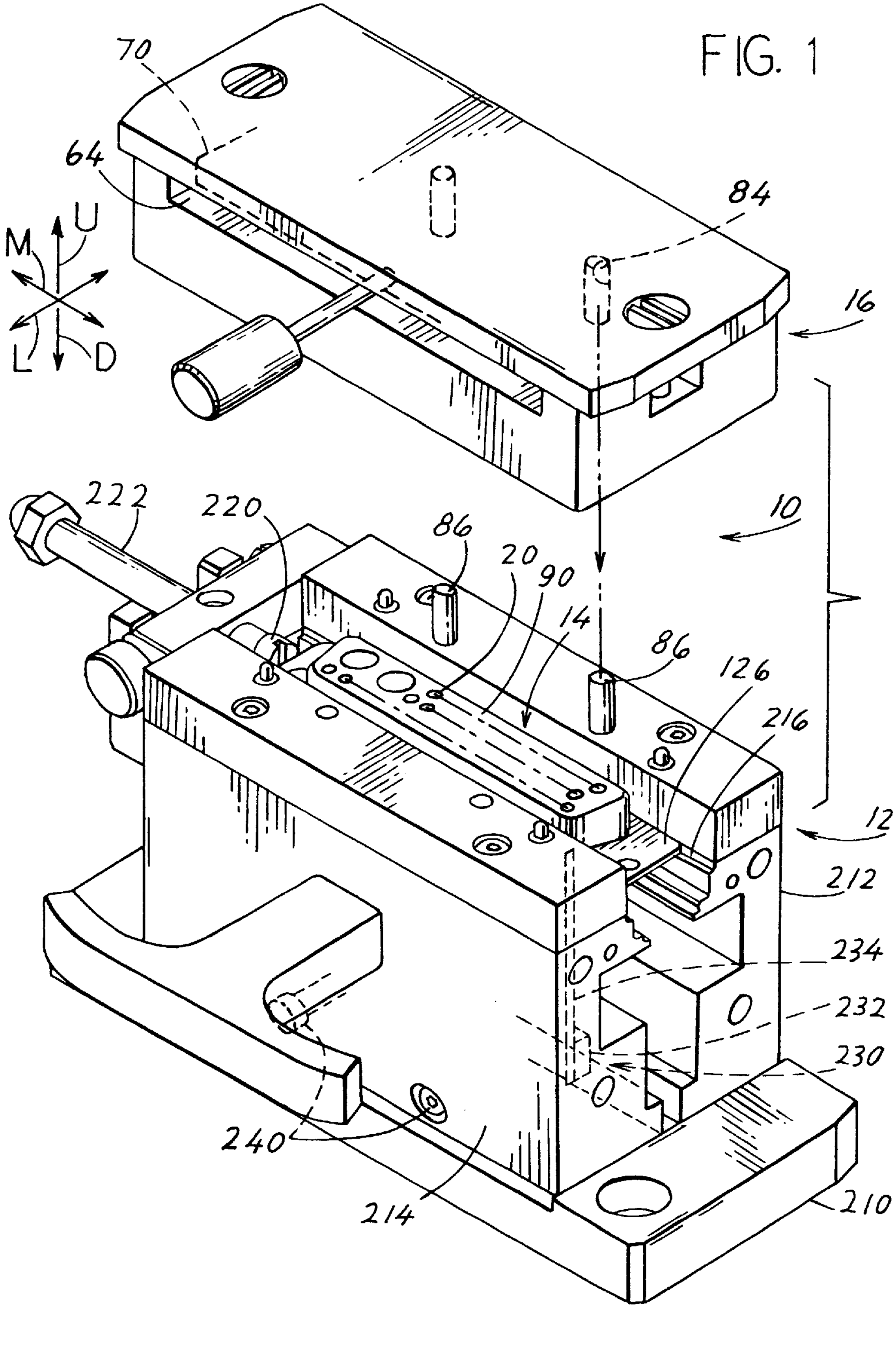
FIG. 1 is an exploded isometric view of contact insertion tooling constructed in accordance with the present invention.

FIG. 1 illustrates contact insertion tooling 10 which includes a lower insert tool 12 that can hold a connector housing 14, and an upper insertion tool 16 that can force electrical contacts downwardly into holes 20 in the connector housing.

Figure 2:
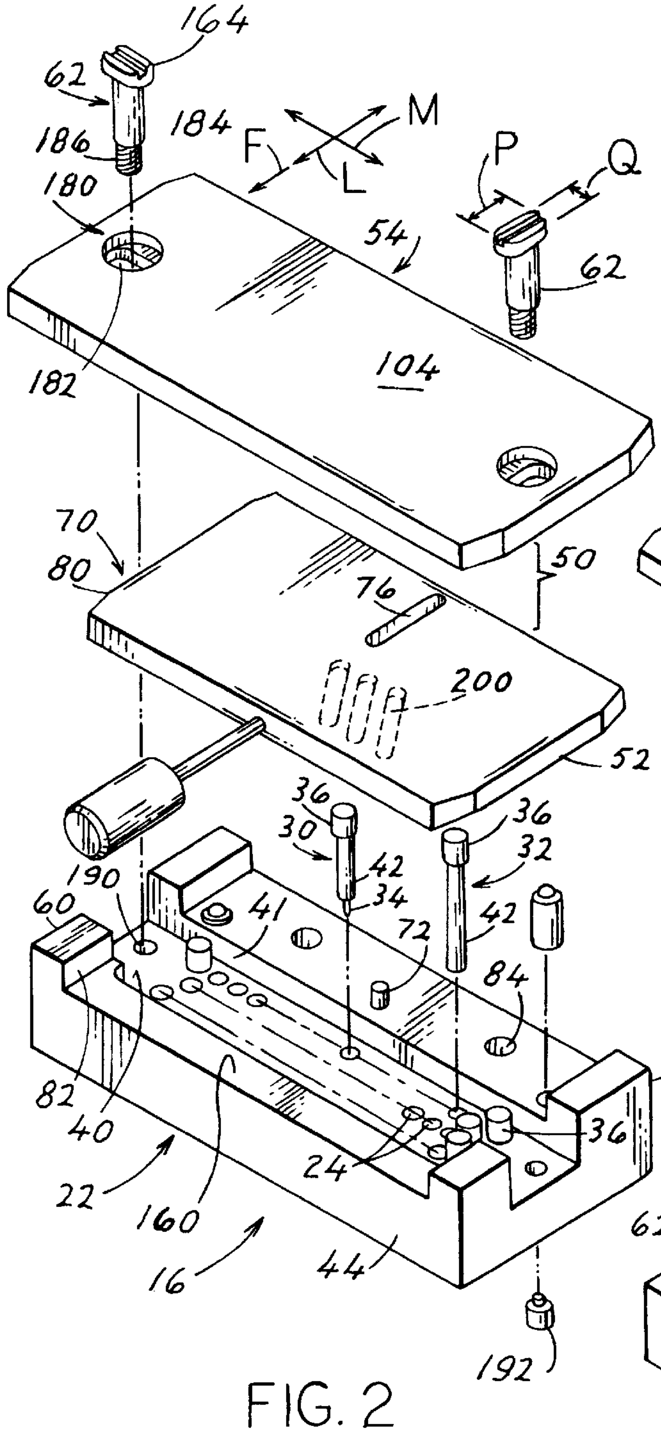
FIG. 2 is an exploded isometric view of the upper insertion tool of the tooling of FIG. 1.
Figure 3:
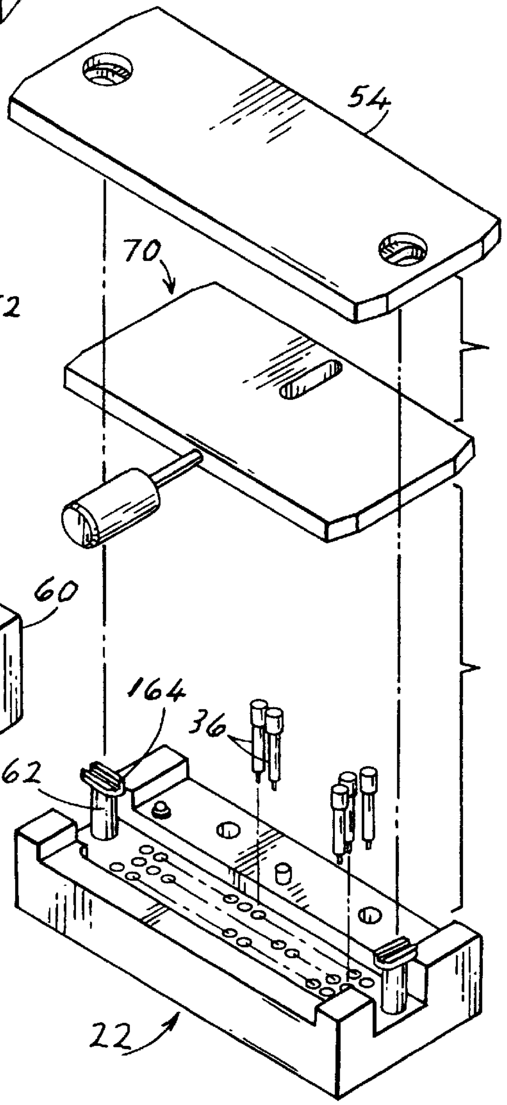
FIG. 3 is a view similar to that of FIG. 2, but showing the upper insertion tool during changeover for use from one type of connector to another type.
Figure 7:
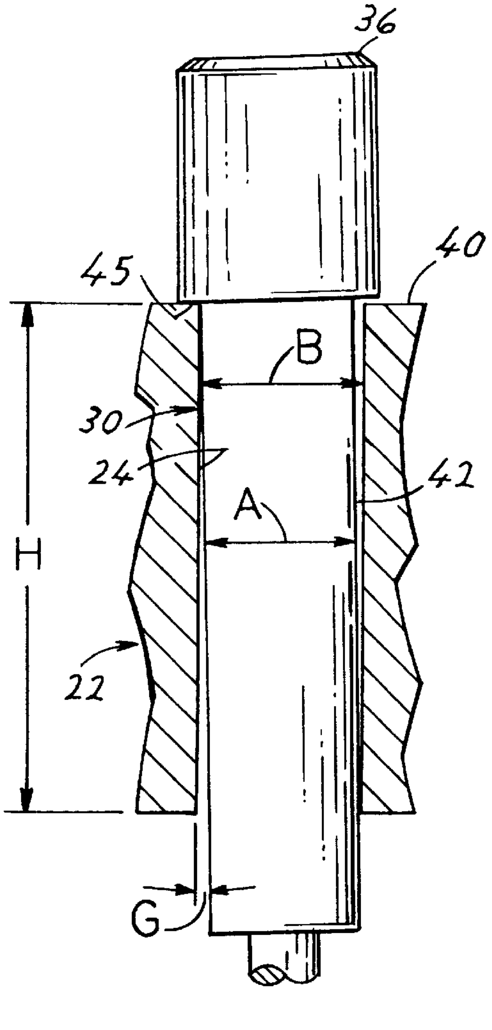
FIG. 7 is an enlarged view showing the looseness of fit of an insertion pin in a block passage.

As shown in FIGS. 2 and 3, the upper insert tool 16 includes a block 22 having rows of vertically-extending pin passages 24. A plurality of insertion pins lie in the passages, with FIG. 2 showing two types of insertion pins 30, 32. The first type 30 is designed for inserting contacts with upper socket ends, the pin having a narrow tip 34 at its bottom for insertion into the top of the socket contact. The second type of insertion pin 32 is tubular with an open lower end, for receiving a pin contact end, and for pressing against a shoulder at the lower end of such pin. Each insertion pin has an enlarged head 36 that rests on a block upper surface 40 that lies in a channel 41, and has a shaft 42 that projects below the lower surface 44 of the block. The pin shafts 42 lie in loose sliding fits in the block passages. FIG. 7 shows that the pin head 36 has a downwardly-facing shoulder 45 that can abut the shoulder 40 formed by the block upper face.

A backup device 50 lies over the insertion pins, and forms a pin-pushing surface 52 that can push down the heads of the pins. The backup device actually includes a cover plate 54 with longitudinally (arrows M) opposite ends 56 that are each supported on projections 60 at the longitudinally opposite ends of the block. Fasteners 62 fix the cover plate over the block 22, with a gap 64 (FIG. 1) between them. The backup device 50 also includes a backup plate 70 that lies in the gap between the block and cover plate, and which can slide therein. A retainer pin 72 (FIG. 2) projecting up from the block, is received in a slot 76 of the backup plate, to prevent loss of the backup plate. Longitudinally opposite edges 80 of the backup plate are closely guided in lateral L movement by lying closely adjacent to vertical guide surfaces 82 of the block. The block has guide holes 84 which slidably receive guide posts 86 (FIG. 1) projecting up from the lower insert tool, to confine the upper insert tool 16 to vertical movement on the lower insert tool.

Figures 6A, 6B, 6C:
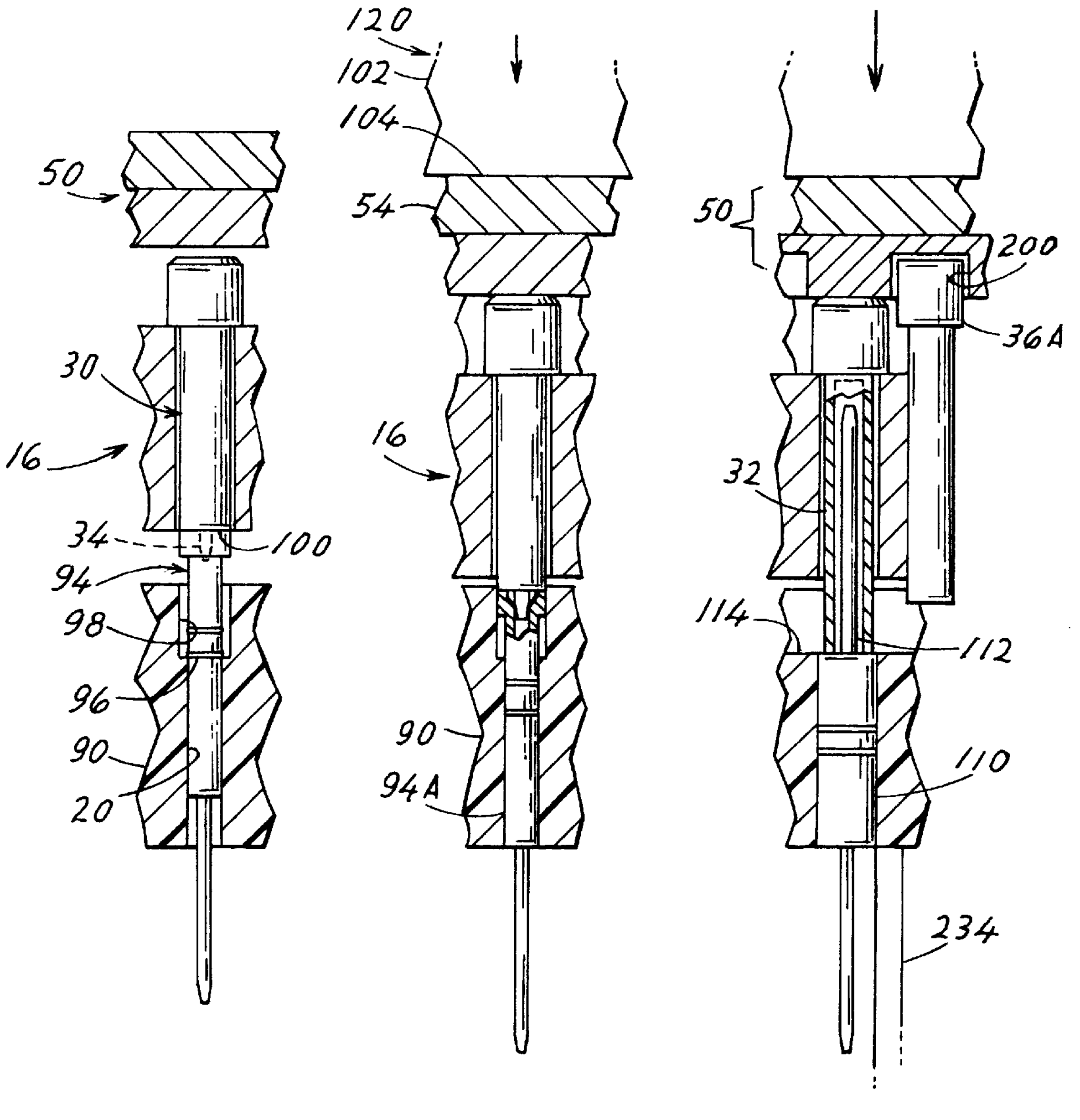
FIG. 6A is a partial sectional view of the upper insertion tool of FIG. 2, showing an insertion pin prior to its forceful insertion of a socket contact into a connector insulator.
FIG. 6B is a view similar to that of FIG. 6B, but with the socket contact fully installed.
FIG. 6C is a view similar to that of FIG. 6B, except that it shows a pin-contact inserted by a corresponding type of insertion pin in a corresponding connector insulator and also shows grooves in the backup plate and shows a support shim under the connector insulator.

FIG. 6A shows a connector insulator 90 with a contact-receiving hole 20 that is designed to receive a contact 94. The particular contact shown is a socket type, which has a hole at its upper end. Initially, the contact has been placed into the insulator hole 20 with no applied force required, the particular contact shown having barbs 96 that rest in an enlarged part 98 of the insulator hole. It requires a force of perhaps 25 pounds to fully insert the contact into the insulator, and such force is applied through the upper insertion tool 16. After the connector insulator with loosely loaded contacts is placed in the lower insertion tool, the upper insertion tool 16 is placed on top of the lower one. Such placement is with the pin projections 34 at the lower ends of the insertion pins 30, lying in the socket hole and with a pin lower shoulder 100 lying against the top of the contact.

As shown in FIG. 6B, a next step is to place the insert tooling in a press 120. A press actuator 102 presses down against the upper surface 104 of the cover plate 54, while the lower insert tool and connector insulator 90 are supported. The downward force results in the contact at 94A becoming fully inserted. The press actuator 102 is lifted, the upper insertion tool 16 is lifted off the lower one, and the connector including its insulator 90 is removed from the lower insertion tool.

Figure 4:
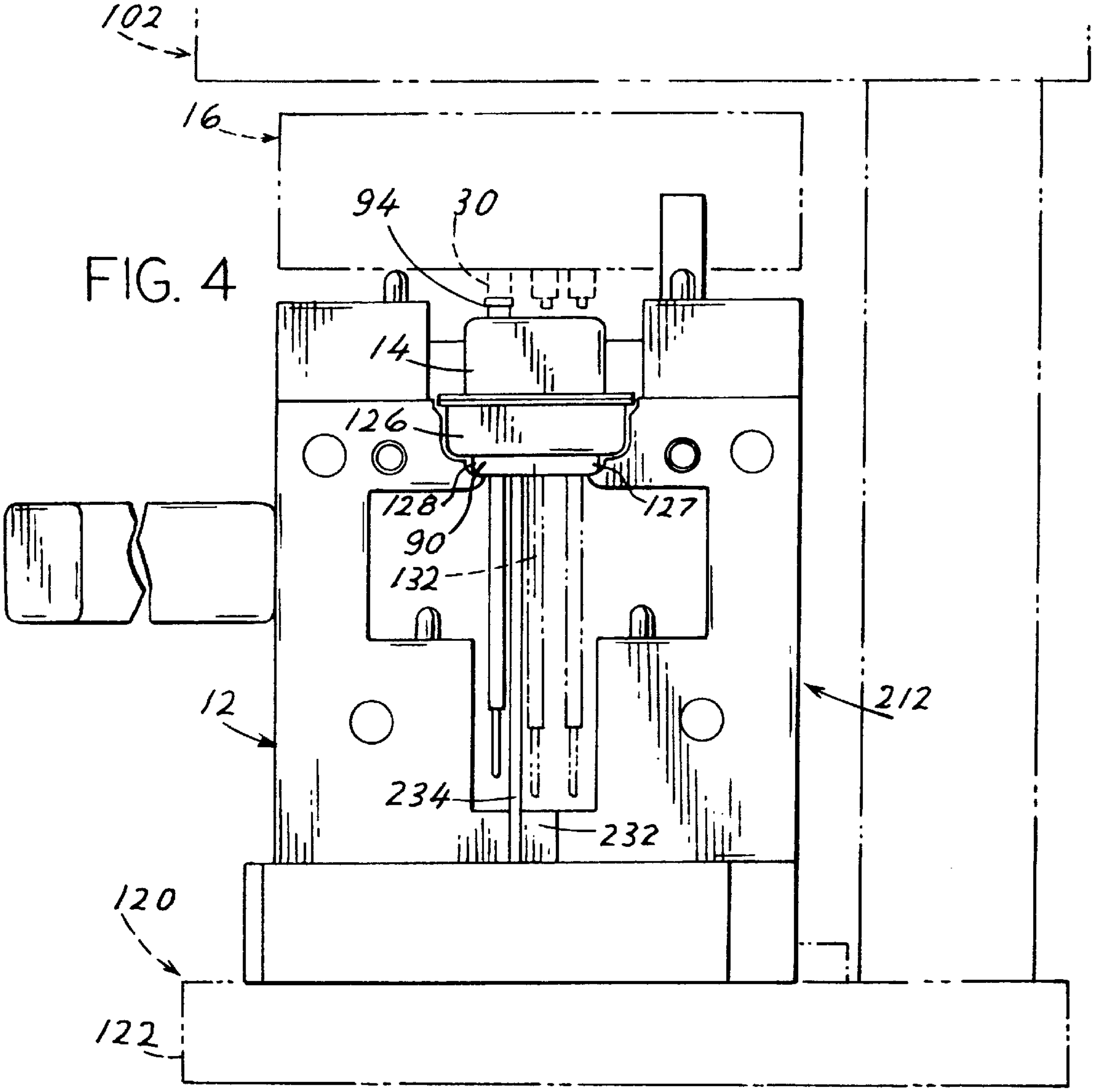
FIG. 4 is an end elevation view of the lower insert tool with a connector in place but showing a contact not yet inserted therein, showing the upper insertion tool in phantom lines, and showing part of a press in phantom lines.

FIG. 6C shows the situation where the contact 110 is a type that has a pin contact portion 112 at its top. The tubular insertion pin 32 receives the pin and presses down against a shoulder 114 of the contact to push it into place. FIG. 4 shows a press 120 that includes the actuator 102 that can be moved down relative to a lower part or anvil 122. The connector 14 is shown mounted on the lower insert tool 12, with the upper insert tool 16 having pins 30 lying on the upper ends of the not-yet inserted contacts 94. It is noted that the connector housing 14 has a shell 126 that surrounds the connector insulator 90. The connector insulator 90 has opposite sides 127, 128 that are located by vertical walls of the tracks. The first side 127 is positioned by the fixed support 212 which positions the upper tool 16 and the insertion pins 30.

Figure 8A:
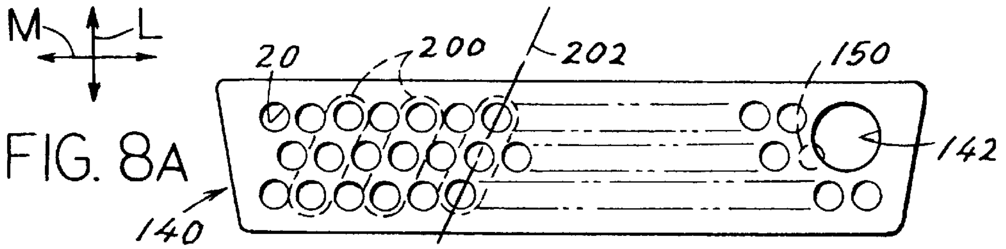
FIGS. 8A–8D show a sampling of connector insulators of different sizes and hole arrangements, in which contacts can be inserted with the tooling of the present invention.
Figure 8B:
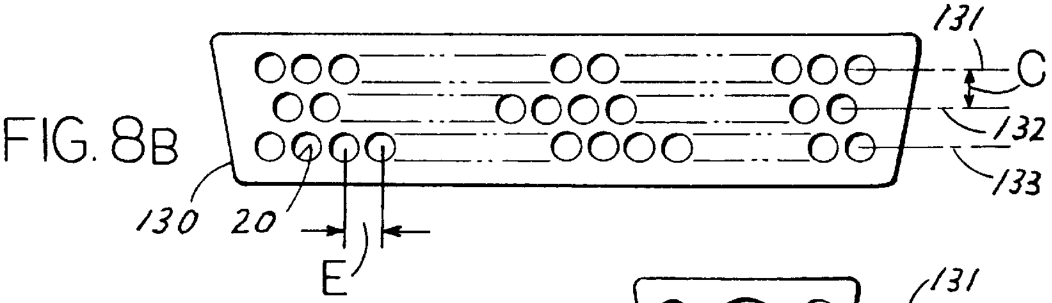
Figure 8C:
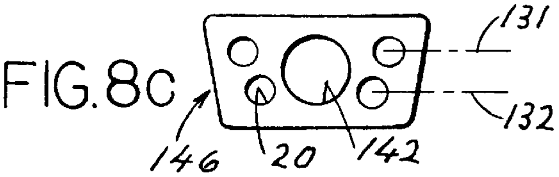
Figure 8D:
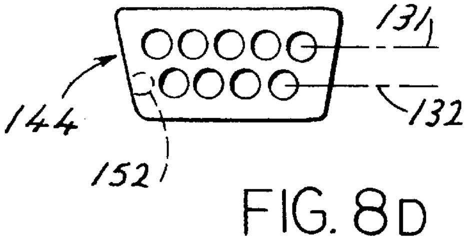

FIGS. 8A–8D show a wide range of commonly available connectors, of a "rectangular type". FIG. 8B shows a large type which is model D-50 which has three rows 131–133 of contact-receiving holes 20. The particular insulator 130 has fifty holes, so it would require a force of about 1250 pounds to insert all contacts simultaneously. FIG. 8A shows a second large type, model D-47WI whose insulator 140 has three rows of holes 20 and a large opening 142 for receiving a coaxial contact. FIG. 8D shows a connector insulator 144 of a small type which is model E-9, that has two rows of holes 20 arranged in two rows 131, 132, with a total of nine holes. FIG. 8C shows another connector insulator 146 which is model E-SW1, which has two rows of contact-receiving holes 20 and a large aperture 142. There are many other models with different numbers of contact-receiving holes 20. Applicant's upper insertion tool 16, shown in FIG. 2, has fifty pin passages 24 arranged in the same pattern as the holes in the insulator 130 of 8B, which is the largest common type of rectangular contact.

In order to set up the upper insert tool 16 (FIG. 2) to insert contacts in any of the rectangular connector insulators with two or three (or even one) row of holes, applicant first removes the backup device 50 from a position over the block 22. Then, insert pins 30 or 32 of the proper type are inserted into all of the pin passages 24 that correspond to connector insulator holes where contacts are to be inserted. With an insulator mounted in a lower insertion tool, the arrangement of insertion pins can be checked by laying the block 22 with insertion pins therein on top of the connector insulator, and noticing if any of the pins are pushed upwardly. For example, if an insertion pin is used for the connector insulator 140 of FIG. 8A but there is an insertion pin lying over the position 150, then that insertion pin will "pop up" and this will be readily noticed. A similar occurrence would take place if, in FIG. 8D an insertion pin were located at the position 152. Of course, an insertion pin at such a location would seriously damage the connector insulator or the insertion pin, when perhaps one thousand pounds force was applied just to that pin.

With the pins in place, the backup plate 70 of FIG. 2 is laid on the surface 160 of the block. Then the cover plate 54 is laid over the backup plate and directly on the projection 60 of the block, and the fasteners 62 are fastened, so heads 164 of the fasteners lie below the upper surface 104 of the cover plate. The assembled upper insertion tool 16 is then placed on the lower one, with the guide holes 84 receiving the guide posts of the lower insertion tool, and the assembled insertion tooling is placed in the press and the upper insertion tool is pressed down.

Figure 5:
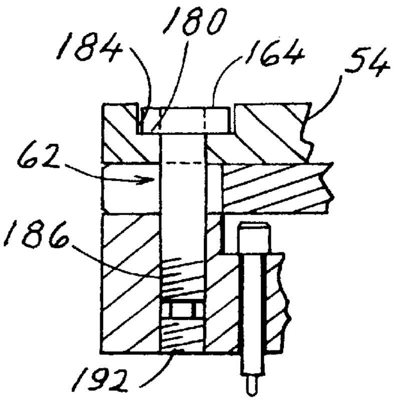
FIG. 5 is a partial sectional view of an end portion of the upper insertion tool of FIG. 2.

The fastener heads 164 of FIG. 2 lie in fastener-receiving holes 180 formed in the cover plate 54. Each fastener-receiving hole has an elongated through hole part 182 and a round recess part 184 that extends only partially through the cover plate, from its upper surface. Each of the fasteners 62 has a threaded lower end 186 that lies in a threaded hole 190 in the block. The heads 164 are elongated with a greater length than breadth, and when they are aligned with the through hole parts 182 the cover plate 184 can be readily removed. When the cover plate is replaced and the heads 164 are turned about 90°, the heads then prevent removal of the cover plate. FIG. 3 shows the usual positions of the fastener heads 164 when the cover plate 54 is removed. Thus, the cover plate can be readily removed, allowing the backup plate 70 to be easily lifted and the insertion pins to be arranged in a specific pattern and checked. It is noted that set screws 192 are used to resist vibration induced turning of the fastener 62. FIG. 5 shows a fastener 62 with its head 164 lying in a recess 184 of the cover plate 54 and turned 90° to hold down the cover plate.

It would be possible to construct the backup plate 70 of FIG. 2 so its lower surface 52 would insert all insertion pins in a single operation. However, applicant provides a row of grooves 200 that allow the insertion of only every other contact along the staggered rows in a first insertion operation, and to then insert the rest of the contacts in a second operation. FIG. 8A shows a few of the grooves 200. It is noted that the holes 20 are staggered along each pair of adjacent rows. Applicant's grooves 200 are inclined along a line 202 from both the longitudinal and lateral directions M, L, so that each groove can receive the heads of insertion pins of each of the three rows. As a result, the grooves 200 receive alternate insertion pins along each row. As shown in FIG. 6C, the heads 36A of alternate insertion pins can be received in the grooves 200, so only every other pin is pushed down by the backup device 50. An advantage of this is that large spreading forces are applied only to every other hole in a long row, to minimize trauma to the insulator and avoid damage to it during insertion of half of the contacts. In a second step, the backup plate 70 is shifted in a forward lateral direction F (FIG. 2), so that there is a pushing surface portion above the heads of all pins and the other half of the pins are pushed down into the connector insulator in a second operation of the press.

The insertion pins such as 30 are loosely slidably received in the pin passages 24. Applicant's FIG. 7 shows this situation, wherein there is a difference in diameters between the diameter A of the pin shank 42 and the diameter B of the pin passage 24 in the block 22. The purpose of such looseness is to allow the pins 30 to shift horizontally slightly to account for the fact that the connector insulators are constructed so there is a tolerance in the precise positions of their holes. For example, in a connector such as shown in FIG. 8B where the row-to-row distance C is 0.112 inch and the pitch E of the holes is 0.108 inch, the precise position of each hole can vary (in directions M and L) by ±3 or 4 mils (1 mil=one thousandth inch) from a theoretical position. An upper insertion tool that applicant constructed for such connectors had a block 22 with passages 24 each of a diameter B of 81 mils, with the shanks 42 of the insertion pins each having a diameter A of 73 mils (the difference is 11% of the pin diameter). This allows each pin to shift by four mils in any radial direction within its pin passage, from a center position. However, the pin passages 24 have a height H of 0.248 inch, to limit the tilt angle G of the pin, since the pin must remain substantially parallel to the connector insulator holes to prevent cocking of the contacts during insertion, such cocking possibly leading to damage. For the specifications given above, the maximum tilt angle G is about two degrees. Applicant prefers that the difference in pin and passage diameters be between 5% and 15% of the pin diameter and that the height H of the pin passage be at least twice the pin diameter A to minimize such tilt while allowing moderate horizontal pin shift.

The lower insert tool 12 shown in FIG. 1 includes a base 210, a fixed support 212 that is fixed to the base, and an adjustable support 214 that can slide in the lateral direction L towards and away from the fixed support. This allows the precise holding of connector housings 14 of different widths (for two and three row connectors). Each connector has a plurality of holding tracks, or connector housing supports 216, on which the connector shell 126 lies, with a vertical surface at the outer edge of each track to precisely, position the connector housing in the lateral directions L. The connector is laid on the tracks of the two connectors and slid in a longitudinal direction until it abuts an end 220 of a longitudinal adjustment screw 222. The connector housing 14 is then precisely positioned, so when the upper insertion tool 16 is lowered with its guide holes 84 receiving the guide posts 86, the lower ends of the insertion pins will lie properly over the contacts.

Applicant places a spacer 230 between the fixed and adjustable supports 212, 214 to properly space them to precisely hold the connector housing 14 in position. The spacer 230 includes a first part 232 and a support shim 234. As shown in FIG. 4, the support shim 234 supports a middle portion of the connector insulator 90, and two of such support shims may be used where necessary, to lie on opposite sides of the middle row 132 of insulator holes. Referring again to FIG. 1, it can be seen that a pair of adjustment screws 240 is provided, which is threadably connected to the thick support 212 and slidably connected to the adjustable support 214, to press the adjustable support firmly against the thick support.

Connectors with rectangular insulators are available in different pitches. For example, a common type of such connector has contacts at a pitch of two millimeters instead of 0.108 inch (2.74 mm). Although the lower insert tool 12 can be used in such case by using the proper spacer, a different upper insert tool is required because of the different spacing of the pin-receiving passages. Similar contact insertion tooling can be used for other shapes of connectors, provided that correspondingly-shaped lower and upper insert tools are provided.

Thus, the invention provides an apparatus for inserting and/or receiving electrical contacts into holes of a connector insulator, which enables the same insertion tooling to be used for a variety of types of connectors having a different number of rows of contact-receiving holes and/or a different number of contacts in each row. The insertion tooling includes a lower insert tool with holding tracks that support the connector housing, and an upper insertion tool that can slide vertically on the lower one and which has insertion pins for pressing down contacts into the connector insulator holes. The upper insertion tool includes a block with a plurality of rows of pin passages that can receive pins with lower ends that can press down a contact into place. The upper insertion tool also includes a backup device which can be pressed down by a hydraulic or manual press to push down the pins. The insertion pins lie loosely in the pin passages to allow for tolerances in the positions of the connector insulator holes, but with the passages being tall enough to avoid more than a minimum tilt of the insertion pins. The backup device includes a backup plate whose lower surface lies directly on heads of the insertion pins and a cover plate. The backup plate is slidable between first and second positions, and has grooves so in the first position only some of the pins are pushed down to insert perhaps only half of the electrical contacts, while in a second position other insertion pins are pressed down in a second insertion step to install the rest of the electrical contacts.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for inserting electrical contacts into holes of an insulator of a first electrical connector housing, comprising:

a lower insert tool comprising a connector housing support for supporting the connector housing;

an upper insert tool;

said upper insert tool being moveable in a vertical sliding path toward said lower insert tool;

said upper insert tool including a block having a plurality of horizontal rows of vertically-extending pin passages and a plurality of insertion pins that each has an upper end and that each projects vertically through one of said passages in a loose sliding fit therein, with each insertion pin having a pin lower end for pushing one of said contacts into one of said insulator holes, and said upper insert tool includes a backup device which lies over said insertion pins and which has a pin pushing surface for lying against said pin upper ends, with said back-up device being removable from a position over said insertion pins so selected insertion pins can be removed from selected passages and inserted into other selected passages by sliding said pins through said passages.

2. The apparatus described in claim 1 wherein:

each of said insertion pins has a shaft that projects through one of said passages, with the difference between passage and shaft diameters being between 5% and 15% of the shaft diameter, and with each passage having a length that is at least twice said shaft diameter, whereby to account for tolerances in insulator hole pitch while keeping the insertion pins aligned with the connector holes.

3. The apparatus described in claim 1 wherein:

said insertion pins have upper ends and said block has a pair of upstanding projections;

said backup device includes a backup plate which lies over said upper ends of said insertion pins;

said backup device includes a cover plate which lies above said backup plate and which lies on said upstanding projections of said block;

said backup plate has a lower surface with at least one groove that is wide enough to receive at least a first group of said insertion pin upper ends, and said backup plate is slidable horizontally between a first position wherein said groove lies over said first group of pin upper ends to receive them and a second position wherein said groove does not lie over said first group of pin upper ends but said backup plate lower surface lies over said first group of pin upper ends.

4. The apparatus described in claim 1 wherein:

said lower insert tool includes fixed and adjustable support parts that each forms one lateral side of said connector housing support, and a base;

said fixed support part is fixed to said base, and said adjustable support part is moveable laterally toward and away from said fixed support part;

a spacer for lying between said support parts to fix their spacing;

at least one screw extending between said support parts and threadably coupled to one of them, said screw being tightenable, to thereby clamp said spacer between said support parts or to clamp said support parts together.

5. The apparatus described in claim 4 including a plurality of connector housings, including said first connector housing, with said plurality of connector housings including a first type that has three rows of contact-receiving holes and a second type that has only two rows of contact-receiving holes, with a first row of both types being spaced the same distance from said first side of each connector housing, wherein:

said block has three rows of pin passages, with said insertion pins being removable from at least a third of said rows;

said lower insert tool and said upper insert tool are each constructed with a pair of vertical guide parts, including walls forming a pair of vertically extending guide holes in one of said tools and a pair of vertically projecting pins fixed to the other one of said tools wherein said pins fit into said guide holes, to accurately position said upper insert tool over said lower tool while letting said upper insert tool slide vertically;

the pair of vertical guide parts fixed to said lower insert tool are fixed to said fixed support part, whereby to accurately insert pins into both said first or second types of connectors.

6. The apparatus described in claim 1 wherein:

said electrical connector housing has opposite sides, and said electrical connector housing has an insulator with upper and lower ends and with at least two laterally-spaced rows of contact-receiving holes extending vertically through said insulator;

said lower insert tool includes first and second support parts that each forms a support track of said connector housing support, and a base, with said electrical connector housing opposite sides each supported on a different one of said support tracks;

a support shim lying between said support parts, said shim having a lower end lying on said base and an upper end lying against the bottom of said insulator lower end, between a pair of said rows of holes.

7. The apparatus described in claim 1 wherein:

said backup device has at least one fastener head-receiving hole;

a fastener having lower ends rotatably mounted about a vertical axis on said block and having an upper end with a fastener head lying in said head-receiving hole, said head having a horizontal length and having a horizontal breadth in a direction perpendicular to said length with the length being greater than the breadth;

said head-receiving hole including a recess part having a width at least as great as said head length to allow said fastener head to turn therein, and said head-receiving hole having a through hole part that can pass said fastener head at only a predetermined rotational position of said fastener head.

8. Apparatus for forcefully inserting electrical contacts into holes of an insulator of an electrical connector housing, which includes upper and lower insertion tools with said upper tool being moveable in a vertical sliding path with respect to said lower tool wherein said lower tool includes a track for supporting the connector housing, wherein:

said upper insertion tool includes a block having a plurality of rows of vertical passages, a backup device removably mounted on top of said block, and a plurality of insertion pins that each extends down through and below one of said passages in a sliding fit therein with said insertion pins being freely slidable upwardly and out of said block passages, but with said insertion pins and said block having shoulders positioned to abut one another to limit downward movement of said insertion pins;

said backup device includes a cover plate lying over and mounted to said block with a space between portions of said cover plate and said block, and said backup device includes a backup plate slidably mounted in said space to move between at least first and second positions;

said cover plate has a lower surface that lies closely over only a first group of said insert pins but not closely over a second group of said insert pins in said first position, with said lower surface lying closely over said second group of insert pins in said second position.

9. The apparatus described in claim 8 wherein:

said rows all extend in longitudinal directions and said rows are laterally spaced, with the holes in adjacent rows being staggered so a pair of pins lying in different adjacent rows lie on an imaginary inclined line that is inclined from both said lateral and longitudinal directions;

said backup plate is slidable only in said lateral direction between said first and second positions;

said lower surface of said plate has a plurality of grooves that are each wide enough to receive the upper ends of said insertion pins, with said grooves extending parallel to said imaginary inclined line.

10. The apparatus described in claim 8 wherein:

said block has a longitudinally-extending channel with said passages extending downwardly from the bottom of said channel;

said insertion pins have enlarged heads that lie in said channel.

11. The combination of an electrical connector with an insulator that has a plurality of horizontally-extending rows of insulator holes and a plurality of rows of contacts that are constructed for press fit insertion into said insulator holes, and apparatus for inserting said contacts with the use of a press or the like that includes an anvil and an actuator that can move toward and away from the anvil, comprising:

a lower insert tool for lying on said anvil, said insulator being mounted on said lower insert tool, and said plurality of contacts lie vertically aligned with said insulator holes so downward pushing of the contacts moves them into said insulator holes;

an upper insert tool which is located over said insulator to be pressed down by said actuator, with said upper insert tool being guided in downward movement toward said lower insert tool;

said upper insert tool including a block having a plurality of horizontally-extending rows of vertical pin passages, a plurality of insertion pins that each projects vertically through one of said passages in a loose sliding fit therein, with each insertion pin having a lower end lying substantially against the upper end of one of said contacts, and a backup device which lies over said insertion pins and which has a pin pushing surface for lying against said pins.

12. The combination described in claim 11 wherein:

said plurality of horizontal rows of pin passages includes more pin passages than the number of holes in said insulator, with a plurality of said passages being vertically aligned with said contacts and containing said insertion pins, and with a plurality of said passages not being aligned with said contacts and being devoid of insertion pins.

13. The combination described in claim 1 wherein:

said plurality of horizontal rows of pin passages includes more pin passages than the number of holes in said insulator, with a plurality of said passages being vertically aligned with said contacts and containing insertion pins, and with a plurality of said passages not being aligned with said holes in said insulator being devoid of insertion pins.

* * * * *